United States Patent [19]

Sansone et al.

[11] Patent Number: 4,725,718

[45] Date of Patent: Feb. 16, 1988

[54] POSTAGE AND MAILING INFORMATION APPLYING SYSTEM

[75] Inventors: Ronald P. Sansone, Weston; Guy L. Fougere, Easton, both of Conn.

[73] Assignee: Pitney Bowes Inc., Stamford, Conn.

[21] Appl. No.: 762,994

[22] Filed: Aug. 6, 1985

[51] Int. Cl.⁴ .................... G06K 21/06

[52] U.S. Cl. .................... 235/495; 235/375

[58] Field of Search .................... 235/375, 432, 495; 283/57, 66, 1

[56] References Cited

U.S. PATENT DOCUMENTS

| | | | |
|---|---|---|---|
| 3,757,942 | 9/1973 | Gunn | 235/495 |
| 3,933,094 | 1/1976 | Murphy | 235/491 |
| 3,938,095 | 10/1976 | Check | 235/495 |
| 4,024,380 | 5/1977 | Gunn | 235/432 |
| 4,117,975 | 10/1978 | Gunn | 235/375 |
| 4,168,533 | 9/1979 | Schwartz | 235/495 |
| 4,637,051 | 1/1987 | Clark | 235/495 |
| 4,641,346 | 2/1987 | Clark et al. | 380/3 |
| 4,641,347 | 2/1987 | Clark et al. | 380/3 |
| 4,649,266 | 3/1987 | Eckert | 235/432 |
| 4,660,221 | 4/1987 | Dlugos | 380/23 |

*Primary Examiner*—Harold I. Pitts
*Attorney, Agent, or Firm*—Robert A. Hays; David E. Pitchenik; Melvin J. Scolnick

[57] ABSTRACT

A postage and mailing information system wherein an encrypted message based upon postage and mail address information is created. This encrypted message is used in the determination of authenticity. Another aspect of the invention resides in placing the encrypted message in the address field of a mail piece for authentication by an automatic high speed sorter.

34 Claims, 6 Drawing Figures

POSTAGE AND MAILING INFORMATION APPLYING SYSTEM

RELATED PATENT APPLICATIONS

Co-pending patent applications assigned to the assignee of the instant patent application and disclosing related subject matter include the following:

"System For Printing Encrypted Messages With A Character Generator And Bar Code Representation", filed July 18, 1983 and having Ser. No. 515,072;

"System Having A Character Generator For Printing Encrypted Messages", filed July 18, 1983 and having Ser. No. 515,073;

"System For Printing Encrypted Messages With Bar Code Representation", filed July 18, 1983 and having Ser. No. 515,086;

"System For Printing And Reading Encrypted Messages", filed July 21, 1983 and having Ser. No. 515,760;

"Method And Apparatus For Verifying Postage", filed Mar. 12, 1984 and having Ser. No. 588,464; and "System For Detecting Unaccounted For Printing In A Value Printing System", filed Apr. 17, 1985 and having Ser. No. 724,372; and "Unsecured Postage Applying System", "Postage Metering Locking System" and "Remote Postage Meter Inspection System" filed concurrently herewith.

BACKGROUND OF THE INVENTION

Since the issuance of U.S. Pat. No. 1,530,852 to Arthur H. Pitney, Mar. 24, 1925, the postage meter has had a steady evolution. Postage meters are mass produced devices for printing a defined unit value for governmental or private carrier delivery of parcels and envelopes. The term postage meter also includes other like devices which provide unit value printing such as a tax stamp meter. Postage meters include internal accounting devices which account for postage value, which postage value is stored within the meter. The accounting device accounts for both the recharging of the meter with additional postage value and the printing of postage by the meter printing mechanism. No external independent accounting system is available for accounting for the postage printed by the meter. Accordingly, postage meters must possess high reliability to avoid the loss of user or governmental funds.

Throughout the years, two general types of postage meters have been used: one that uses a rotatable print drum and is referred to as a rotary postage meter, and the other that uses a stationary print head and a reciprocating platen and is referred to as a flat bed postage meter. Most recently, there has been a change from a completely mechanical device to meters that incorporate electronic components extensively. Although there have been a number of changes, there are certain elements that remain constant. For example, the need for security is absolute. In prior postage meters, such security is applied both to the printing portion of the meter and to the accounting portion. The reason for the absolute security requirement is because a postage meter is printing value, and unless security measures are taken, one would be able to print unauthorized postage, thereby defrauding the U.S. Postal Service. Most security measures taken are of a physical nature, but recently there have been suggestions for the use of encryption to ensure that a postage indicia is valid. Nevertheless, such encryption merely supplements the physical security systems that have been used and suggested by the prior art. Furthermore, the known prior encryption systems attest to the validity of the indicia but provide no means for determining whether the printed indicia is just a copy of a valid indicia. Additionally, prior systems relied upon the post office accounting for postage by monitoring the number and value of mail pieces sent by a particular meter user.

Another common factor in prior postage systems is the inclusion of a postage indicia normally placed in the upper right hand corner of one surface of an envelope or package. This indicia has taken a specific form. The postage amount is contained in a rectangular border and the date of the postage impression appears in a circular border. This form has evolved from the original appearance of a canceled stamp wherein the stamp is of a rectangular configuration and the cancellation mark included the date within a circle. Also included in this indicia is the postage meter number and the city and state from which the envelope was mailed.

Although postage meters have performed satisfactorily in the past and continue to perform satisfactorily, with the advance of electronics, postage systems are needed that are less expensive and more flexible while still providing the serviceability and security required. Additionally, it would be desirable to have a postage system that is more compatible with contemporary mail processing systems.

SUMMARY OF THE INVENTION

Encryption is utilized to prevent fraudulent postage taking. An encryption message is derived from postage information and/or recipient address information and applied to a mail piece. With the inclusion of recipient address information in the encryption message, there is a relationship between authentication and the mail piece that is unique for each mail piece. In accordance with one aspect of the instant invention, the postage information and encryption are placed in the address field of the mail piece along with address information. With the encryption in the address field, authentication can be made on the fly by an automatic mail scanning/sorting machine quickly and efficiently.

DETAILED DESCRIPTION OF THE PREFERRED EMBODIMENT

Figure 1:
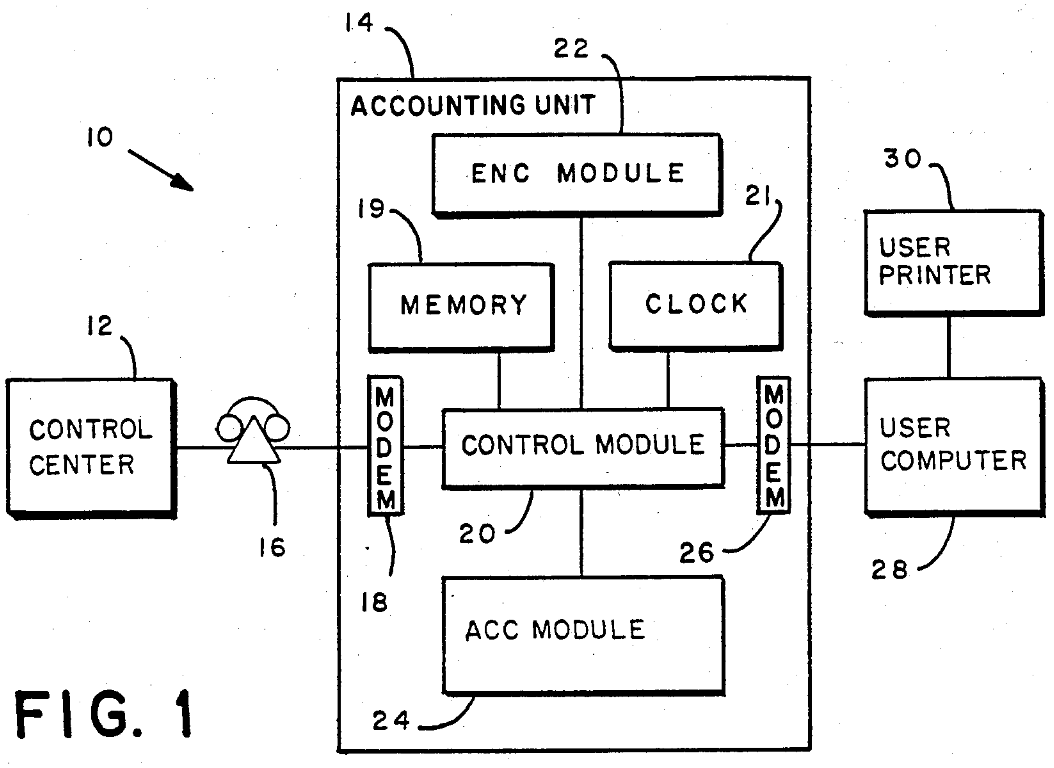
FIG. 1 shows a block diagram of a system that utilizes the instant invention.

Referring initially to FIG. 1, a postage and mailing information applying system is shown generally at 10 and includes a control center 12 and an accounting unit 14 that are in communication with one another through a communicating device such as a telephone 16, facsimile machine, telex machine, and the like.

Located within the accounting unit 14 is a modem or converter 18 which provides communication between the telephone 16 and a control module 20 of the accounting unit, which control module may be a CPU such as an Intel 8085 microprocessor available from Intel Corporation, Santa Clara, Cal. The control module 20 has a memory 19 and a clock 21 either integral with or in connection therewith. The memory 19 would store the transaction number, i.e., a number assigned to the accounting unit of the occasion of clarifying postage to the system 10, the customer number and the like. In communication with the control module 20 is an encryption module 22 as well as an accounting module 24. The encryption module would be any of a readily available encryption device which may, for example, encrypt in accordance with the NBS Data Encryption Standard (DES) pursuant to a preset secure key. An example of a suitable encryption module 22 would be an Intel 8294 encryptor. The accounting module 24 may be a battery augmented RAM that incorporates the ascending and descending registers. As is known from previous postage metering devices, the ascending register is the register that records the amount of postage that is dispensed or printed on each transaction and the descending register is the register that records the value, or amount, of postage that may be dispensed and decreases from an original or charged amount as postage is printed. Another modem 26 within the accounting unit 14 provides communication between the control module 20 and a user computer 28. The user computer may be any typical computer that has input, logic and output for example, a personal computer such as the IBM AT available from IBM Corp., Armonk, N.Y. Connected to the user computer 28 is a user printer 30. Although the user printer may be of any type that is capable of printing individual alpha-numerics, a dot matrix printer is preferable since a dot matrix printer is capable of printing any configuration including bar codes.

In the block diagram shown in FIG. 1, the control center 12 may be a Post Office which serves as a source of postage value. Systems are known whereby a postage meter may be charged remotely upon a user providing his assigned customer number to the Post Office, see for example U.S. Pat. No. 4,097,923. The Post Office, in turn, will provide postage value that is automatically input to the customer's postage meter, in this case the accounting unit 14. The postage value will be received within the descending register portion of the accounting module 24 to increase the amount to a figure that is the sum of that amount being charged and the unused amount from previous charging. In the system of FIG. 1, the secure portion of the postage meter is replaced by the accounting unit 14 that is a secure unit such that tampering by physical, electronic or magnetic means is inhibited. Security features such as shields, break away bolts and the like are well known and the means for securing the accounting unit 14 will not be further described. In a preferred embodiment, the accounting unit 14 would have no display and would only be accessible by the user computer 28 upon an assigned code word being received by the control module 20 of this accounting unit 14 from the user computer. It will be understood that the user printer 30 is not a secure printer nor are the links between the user computer 28 and the accounting unit 14 and the user computer and the user printer. The postage information to be printed by the user printer 30 would include an encryption number that is generated by the encryption module 22. Encryption may be based upon any recognized code such as DES, supra, National Security Agency (NSA) cipher or Rivest, Shamir and Adleman (RSA) cipher. Upon the appropriate information being supplied to the accounting unit 14 from the user computer 28, the encryption module 22 would generate an encryption number which would then be communicated through the user computer 28 and printed by the user printer 30. This supplied information could include, the customer number, the value of postage and the like. In a particular embodiment of this invention, the street address, zip code and the like of the recipient is included in the encryption for the purposes of authentication. As used in this disclosure, authentication is defined as the determining of the genuineness of postage printed upon a mail piece.

Figure 2:
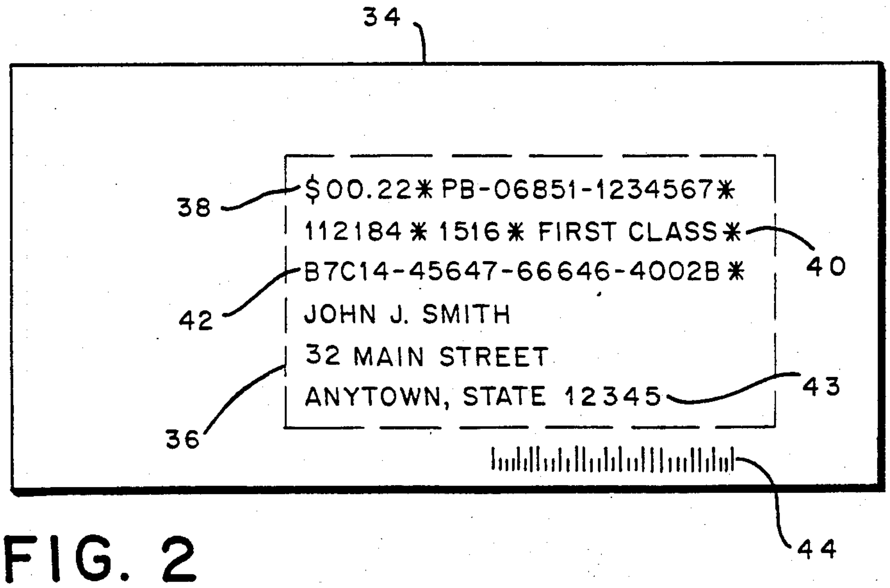
FIG. 2 is a plan view of an envelope having postage information printed thereon in the address field in accordance with the instant invention.

Referring now to FIG. 2, a format is shown for applying postage information and mailing information to the address field of a mail piece such as an envelope 34. By postage information is meant postage amount, date of mailing, meter or customer number, transaction number, class of mail and the like. By address information is meant the house number, name, city, state, zip code and the like of the mail recipient. In this particular configuration, an envelope 34 is shown with a label 36 attached in the address field portion of the envelope. As used in this specification and claims, the term address field has the meaning as defined in U.S. Postal Service regulations. Such definition may be found in the U.S. Postal Service's pamphlet "Guide to Business Mail Properties", page 20, September, 1984. Although this embodiment is described with the combination of a label 36 and envelope 34, it will be appreciated that the characters may be printed directly upon the envelope or upon an insert that would be placed within a window type envelope. It will be understood that this label 36 replaces and eliminates the need for the normal indicia that is applied to the upper right hand corner of a mailpiece. One of the features of the instant invention is that a standard indicia is no longer required because the security features provided by such standard indicia are replaced by the security offered by encryption.

In a preferred embodiment, the first line 38 of the label would have information relative to the amount of postage and the customer number. The second line 40 contains the date of the mailing, the time the postage is imprinted and the class of mail. The third line 42 contains an encryption message in the form of numbers and letters that may be derived from the information on the first two lines as well as information from the address of the recipient of the mail piece that follows this third line. As shown, the printed lines are parallel to one another to facilitate automatic reading. It will be appreciated that other conventional machine readable configurations may be used rather than parallel lines.

The postage amount, customer number, date and class of mail are inputted through the keyboard of the user computer 28 to the control module 20. The encrypting module 22 then generates an encryption number or message and upon the print command being given by the computer operator, the time is determined and an encrypted message is obtained. This encryption message 42, is then printed by the user printer 30 on line 3 of the label 36. With this information, a Postal Service representative would be able to input the encryption message into a suitable computer and determine whether the postage is genuine by decrypting the information.

Figure 3:
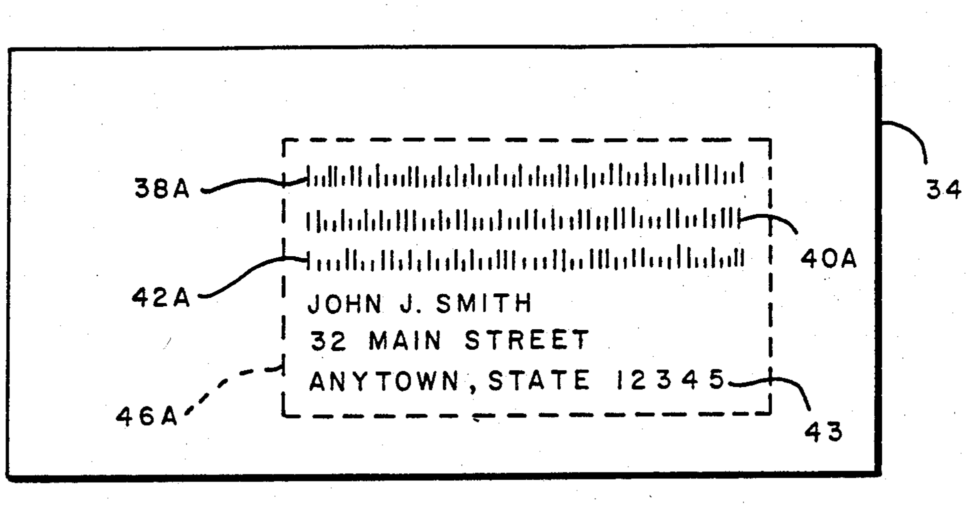
FIG. 3 is a view similar to FIG. 2 but with bar codes instead of alpha-numerics in a portion of the address field.

Although the system has been shown using alpha-numerics in the address field, it will be appreciated that bar code may be used to print the first three lines as shown in Fig. 3. This bar code may be of any form including the bar-half bar configuration used presently by the Postal Service. The bar codes could be combined in an indicia for aesthetic purposes and placed within the address field or in the upper right hand corner of the envelope 34. Although the bar code is shown extending parallel to the alpha-numerics, it will be appreciated that the bar codes could extend perpendicular thereto. The bar code can also appear on the bottom edge of the envelope as shown at 44 so as to be read by present Postal Service equipment.

The advantage of the system shown and described is that one is able to eliminate the standard postage indicia that has been in practice for decades and still provide the assurance associated therewith. In addition, by having all the information in the address field, authentication may be obtained quickly from information appearing on the envelope. Because of the presence of the recipient's zip code, the encryption message 42 that appears on the label 36 is unique for that mail piece. More specifically, there is a connection between the mail piece and the encryption message. In prior systems, there was no relationship between the code or encryption and the mail piece, but rather a seed number or the like was used in conjunction with sender information such as the sender's zip code, meter number, and the like. Present high speed automatic scanning/sorting machines incorporate OCR readers capable of reading the information in the address field of an envelope 34 and sorting in accordance therewith. An example of such an automatic scanning/sorting machine is the Pitney Bowes Optical Character Reader described in publication 150 of the United States Postal Service entitled "Automatic Mechanization for Mail Processing Systems", page 14, May, 1985. A decryption module could be added to such an automatic sorting machine by which the encrypted line 42 would be read as well as the address line by the OCR reader. This encryption module would determine the authenticity of the postage not only on the basis of the visual tests, postage, date, meter number and the like, but on the basis of the recipient address. In this manner, not only is a check made for authenticity of the postage but also for the fact that the encrypted line belongs to that particular piece of mail and only that piece because of the recipient address. More specifically, what is contemplated is a two way encryption scheme where the decryptor has a "key" to determine authenticity based upon information on the face of the envelope 34. This is in contrast to a two way scheme where seed numbers are used and encryption is performed twice and compared.

Figure 4:
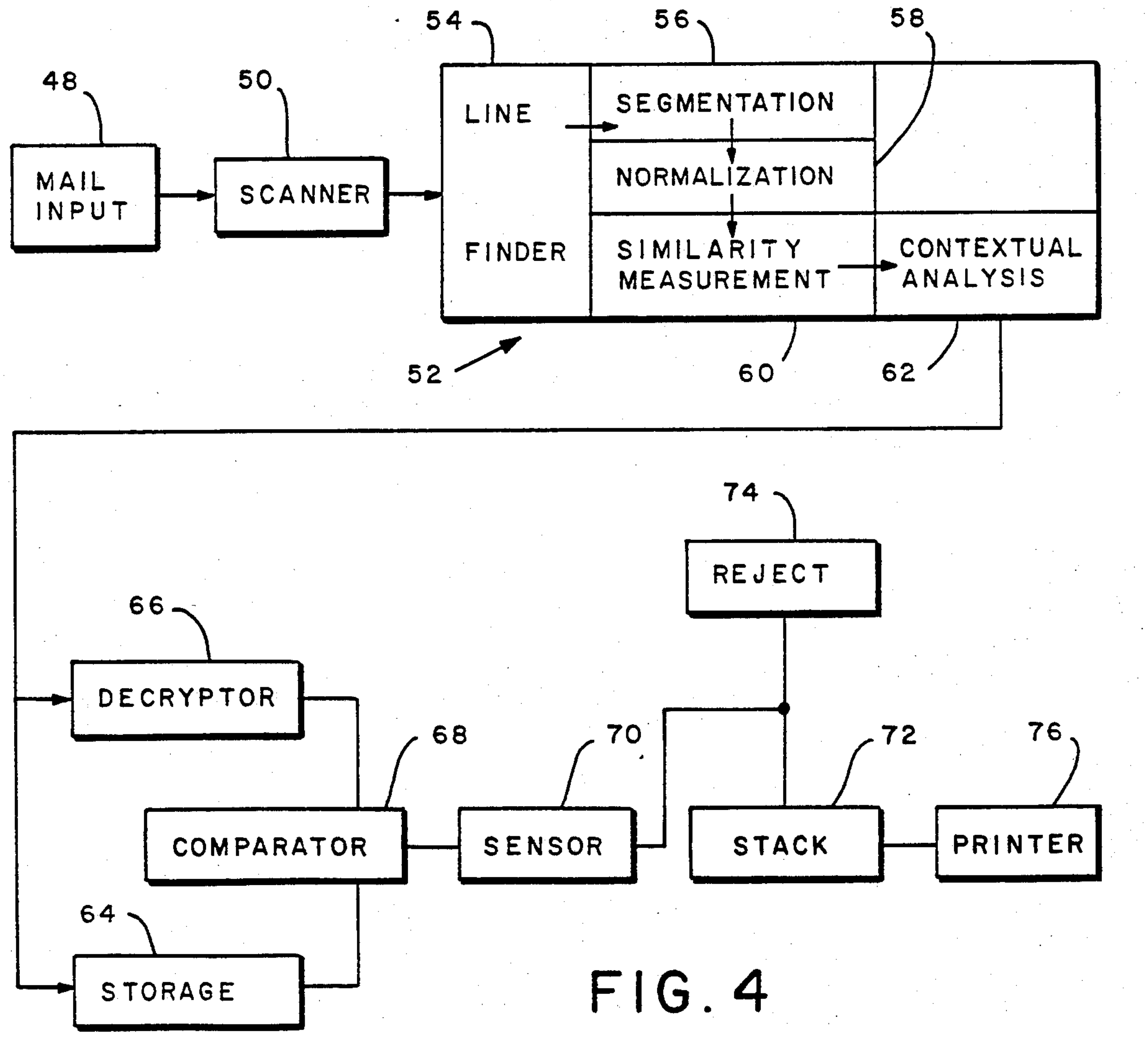
FIG. 4 is a block diagram of a mail scanning/sorting machine that would have application in the instant invention.

Referring now to FIG. 4, such an automatic scanning/sorting machine with deciphering capability is shown. The machine includes a mechanical transport unit 48 that singulates batches of mail into a stream of mail pieces that are conveyed with a predetermined separation past the various stations of the machine including a scanner 50, a line finder 54, a segmentation block 56, a normalizer 58, a simularity measurer 60 and a contextual analysis block 62. Each envelope 34 is conveyed past the scanner 50 which produces digitized binary images of the address field consisting of black and white pixels. The line finder 54 finds the lines in the address field which are to be read. The segmentation module 56 separates the lines into characters. The normalization block 58 transforms the segmented characters into a predetermined size. The standardized character images are then transferred to a similarity measurement block 60 where they are compared against stored known character templates to obtain character recognition. The results of these comparisons are sent to the contextual analysis unit 62 where the final decision is made for the address portion of the information while the encryption portion passes through. An ASCI1 code representation of the recognized characters is then sent to both a buffer 64 that simply stores the address information and to a decipher 66 that decrypts the encryption line 42. The information from the buffer 64 and decipher 66 is then sent to a computer 68 where the information from each is compared. The results of the comparison are sent to a sensor 70 where a determination is made as to the authenticity of the postage on the mail piece. If it is found to be authentic, the envelope 34 is routed to a sorting stack module 72, but if it is deemed to be fraudulent, this envelope is sent to a rejection bin 74. In this way, genuineness of the postage on an envelope can be determined on the fly. Obviously, this process is enhanced because the printed information on the envelope 32 is applied in a parallel fashion thereby facilitating fast, automatic processing. If authentication is made, the encryption message may be printed in bar code form at the bottom edge of the envelope 32 as is now done with the address information by a bar code printer 76 of an automatic mail sorter. It will be understood that this bottom edge bar printing of the encrypted message may be performed alternatively by the user's printer 30 upon it's being programmed to do so.

Figure 5A:
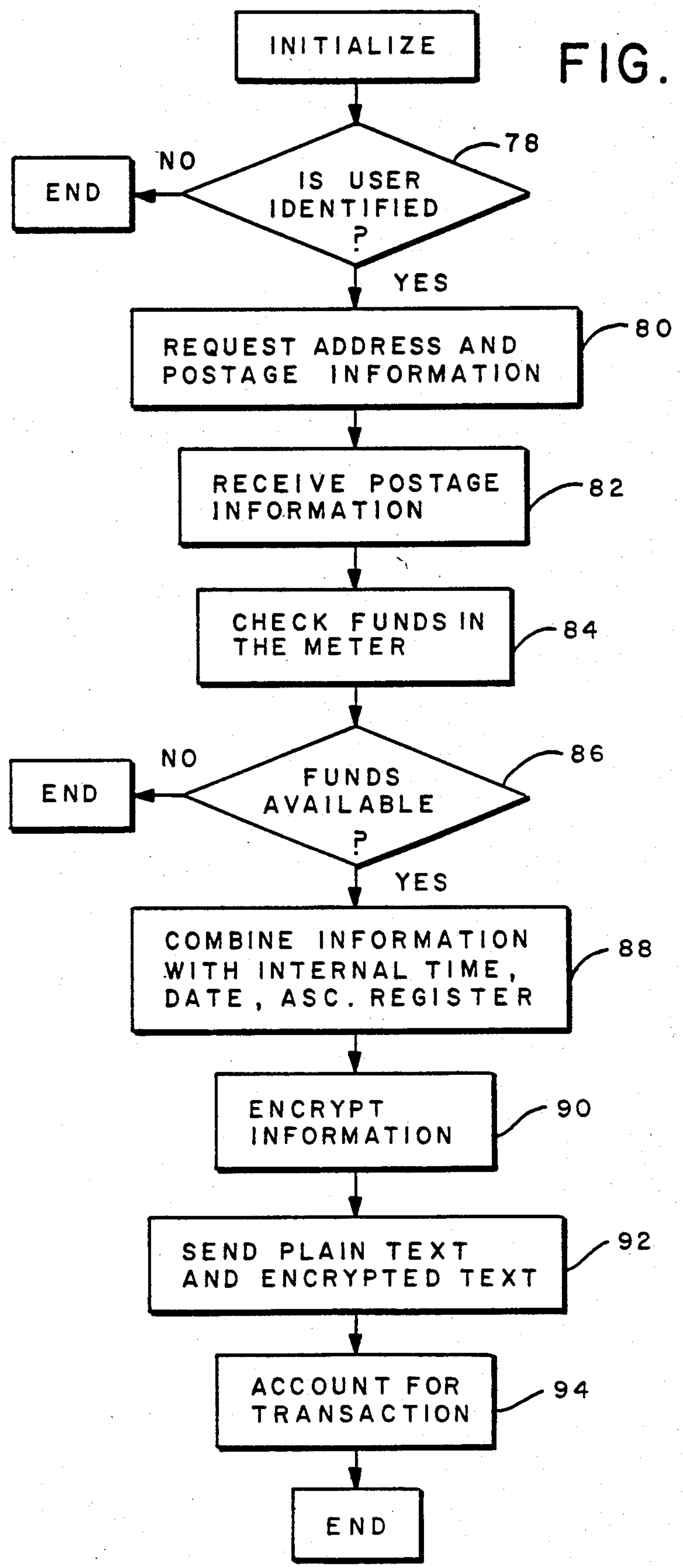
FIG. 5 consisting of 5A and 5B, is a flow chart showing cooperation between two components shown in FIG. 1.
Figure 5B:
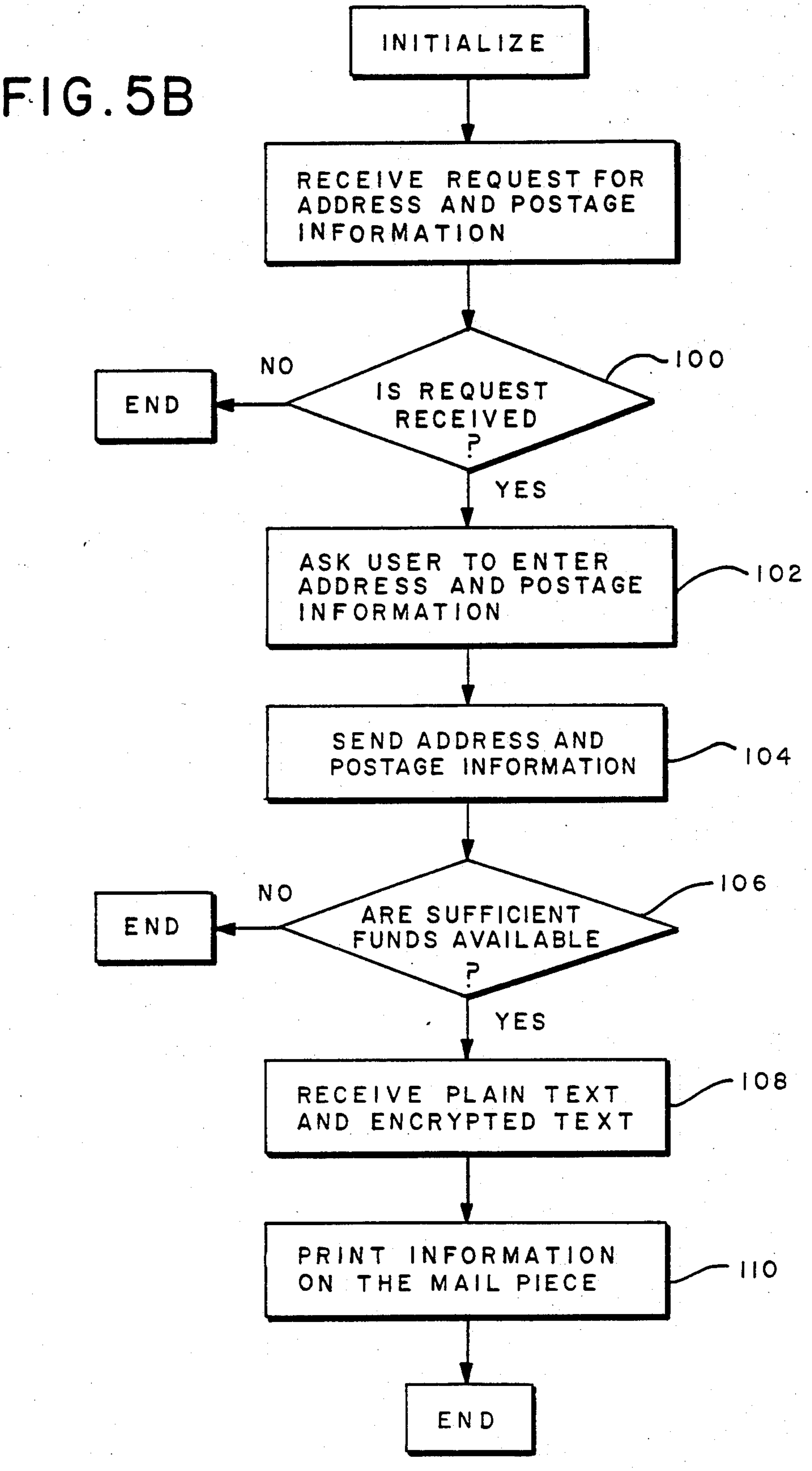

Referring now to FIG. 5, a flow chart is shown wherein the cooperation between the accounting unit 14 and the user computer 28 is shown. The system is initialized 76 and a request is made 78 by the accounting unit 14 as to whether the user is properly identified. If the user is identified, a request is made by the accounting unit 14 for address and postage information 80 for the purpose of generating the encryption message. The information is received 82 and a check for funds is requested 84. A determination is made if funds are available 86 and if sufficient funds are available, the information is combined 88 with the internal time, date, ascending registers and the other information in the accounting unit 14. The encryption message is generated 90 and the plain text and encrypted text are sent 92 to the user computer 28. As the plain text and encrypted text are sent, the transaction is accounted for 94 and the system is returned to its starting point. On the other hand, if funds are not available 86, then a message is sent to the user computer 28 that there are insufficient funds.

The user computer 28 initially receives the request 100 from the accounting module 14 for the address and postage information 10. With this request, the user would enter the appropriate address and postage information 102 and this would be sent 104 to the accounting unit 14. After the address and postage information are conveyed, the question is asked whether sufficient funds were received 106. If sufficient funds were received, then the plain text and encrypted text are received 108 from the accounting unit 14 and the command is given 110 to print the information on a mail piece 34.

What is claimed is:

1. A mail piece containing a plurality of substantially parallel printed lines thereon, said lines including encrypted information useful for authenticating said mail piece; said lines of said mail piece comprises:

at least one said line containing postage information at least one said line containing recipient address information; and at least one said line containing said encrypted information, said encrypted information being derived from said postage information and said recipient address information such that a relationship between said recipient address information and said encrypted information can be used to authenticate said mail piece.

2. The article of claim 1 wherein said line containing encrypted information is in bar code form.

3. The article of claim 1 wherein said line containing encrypted information appears on the edge of the mail piece.

4. The article of claim 1 wherein said lines appear in the address field of the mail piece.

5. A mail piece containing a plurality of machine readable lines thereon, said lines including encrypted information useful for authenticating said mail piece; said lines of said mail pieces comprise: at least one of said lines containing postage information, at least one of said lines containing recipient address information and at least one of said lines containing encryption information such that a relationship between said recipient address information and said encrypted information can be used to authenticate said mail piece.

6. The article of claim 5 wherein at least said line containing encrypted information is in the form of bar code.

7. The article of claim 5 wherein said lines appear in the address field of the envelope.

8. In a method of applying postage and mailing information upon a mail piece such that said information may be used to authenticate said mail piece, said method comprising the steps of:

applying upon said mail piece at least one line that contains postage information;

applying upon said mail piece at least one line containing recipient address information in parallel with said at least one postage information line;

applying upon said mail piece at least one line containing an encrypted message which is parallel to said postage information and recipient address information lines such that a relationship between said recipient address information and said encrypted information can be used to authenticate said mail piece.

9. The method of claim 8 wherein said lines are applied within the address field of said mail piece.

10. The method of claim 8 including the steps of:

conveying said mail piece through an automatic sorting machine containing an OCR reader module and a decryption module;

reading said lines in said address field of said address field of said mail piece; and decrypting the encrypted information and authenticating the postage applied to said mail piece.

11. The method of claim 8 including the step of printing a bar code representation of said encrypted message along one edge of said mail piece.

12. In a method of placing an encryption message upon a mail piece such that a relationship between said recipient address information and said encrypted information can be used to authenticate said mail piece, said method comprising the steps of:

communicating recipient address information to an encryptor, communicating postage information to said encryptor, deriving an encryption message based upon the communicated recipient address information and the postage information, and placing the encryption message on said mail piece.

13. The method of claim 12 including communicating the recipient address zip code to said encryptor.

14. The method of claim 13 including communicating a mail sender identification number to said encryptor.

15. The method of claim 12 including printing said encryption message onto a label and attaching the label to said mail piece.

16. A system for providing self authentication of a mail piece, comprising:

encryption means operative to derive an encryption message based upon postage information and address information, means for communicating recipient address information to said encryption means, means for communicating postage information to said encryption means, and means for placing onto a mail piece an encryption message generated by said encryption means such that a relationship between said recipient address information and said encrypted information can be used to authenticate said mail piece.

17. The system of claim 16 including mail piece authentication means including:

means for decrypting said encryption message, and means for comparing the decryption with said postage information and said address information to determine the authenticity of said mail piece.

18. The system of claim 17 wherein said address information includes the zip code of said mail piece recipient.

19. The system of claim 17 wherein said postage information includes an identification number unique to the mail sender.

20. The system of claim 17 wherein said mailing information includes the house number of said mail piece recipient.

21. A system for providing self authentication on a mail piece, comprising:

encryption means operative to derive an encrypted message based upon address information, means for communicating recipient address information to said encryption means, and means for placing onto a mail piece an encrypted message derived from said address information by said encryption means such that a relationship between said recipient address information and said encrypted information can be used to authenticate said mail piece.

22. The system of claim 21 including mail piece authentication means including:

means for decrypting said encrypted message, and means for comparing the decryption with said address informatin to determine the authenticity of said mail piece.

23. The system of claim 22 wherein said address information includes the zip code of the mail piece recipient.

24. The system of claim 23 wherein said address information includes the street address of the mail piece recipient.

25. In a method of placing an encryption message useful for authenticating a mail piece upon said mail piece, said method comprising the steps of:

communicating recipient address information to an encryptor, deriving an encryption message based upon said communicated recipient address information, and placing said encrypted message on said mail piece such that a relationship between said recipient address information and said encrypted information can be used to authenticate said mail piece.

26. The method of claim 25 including communicating the mail address zip code to the encryptor.

27. The method of claim 26 including communicating a street address of said recipient to said encryptor.

28. The method of claim 25 including printing said encryption message onto a label and attaching said label to said mail piece.

29. A mail piece containing thereon postage information, recipient mailing address information and encryption information derived from said postage information and recipient mailing address information such that a relationship between said recipient address information and said encrypted information can be used to authenticate said mail piece.

30. The article of claim 29 wherein said encryption information is in bar code form.

31. The article of claim 30 wherein said encryption information appears on the edge of said mail piece.

32. The article of claim 29 wherein said information appears in the address field of said mail piece.

33. The article of claim 29 wherein said information appears in alpha-numeric form.

34. A mail piece containing information thereon useful for authenticating said mail piece said information comprises:

recipient mailing address information; and encryption information derived from said recipient mailing address information such that a relationship between said recipient address information and said encrypted information can be used to authenticate said mail piece.

* * * * *